Feb. 21, 1928.
C. N. BERGMANN
1,659,802
UNIT MEASURING MACHINE
Filed May 7, 1927
4 Sheets-Sheet 2
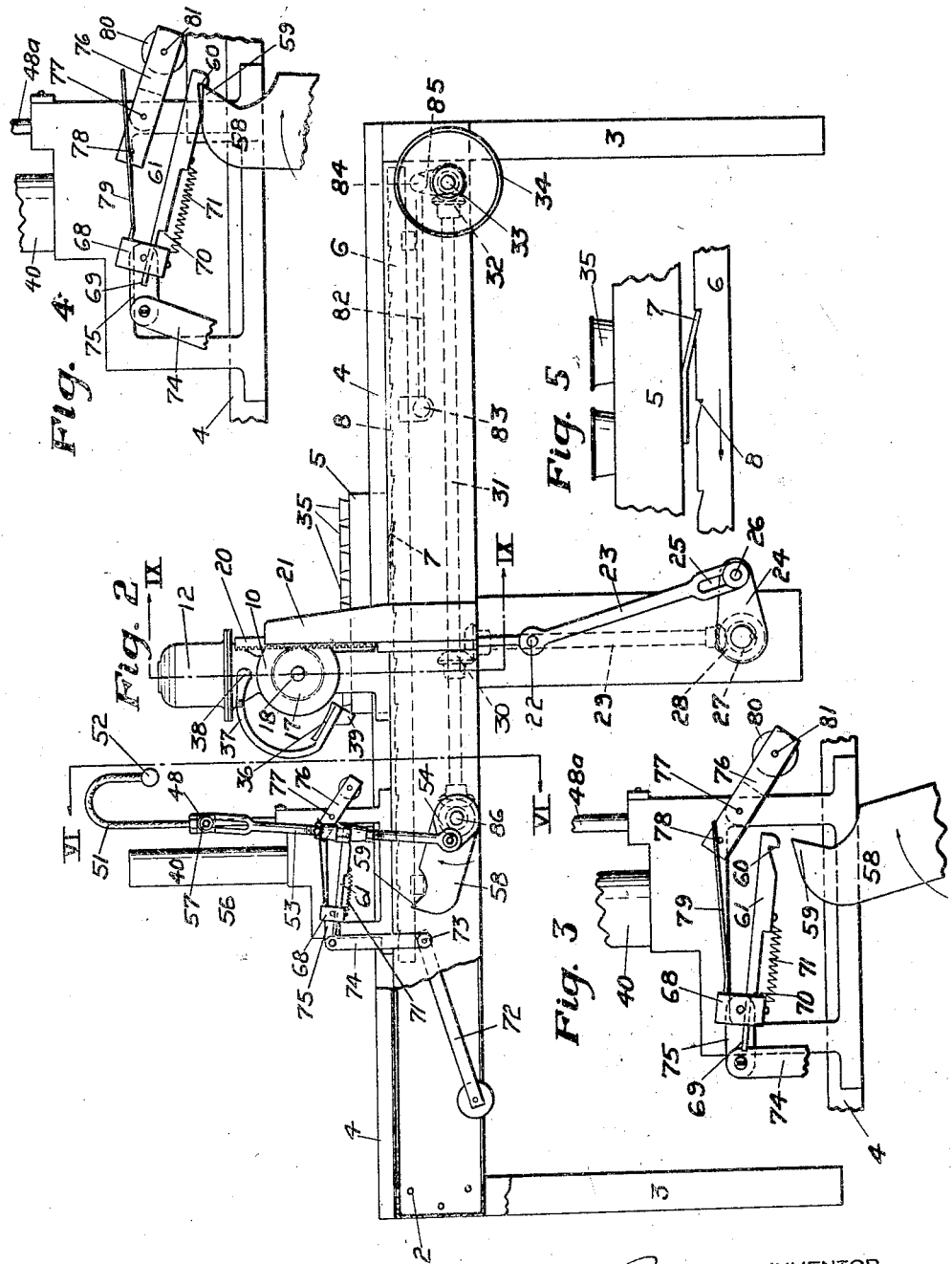
INVENTOR
Christian N. Bergmann
BY
O. M. Clarke
ATTORNEY Feb. 21, 1928.
C. N. BERGMANN
1,659,802
UNIT MEASURING MACHINE
Filed May 7, 1927
4 Sheets-Sheet 3
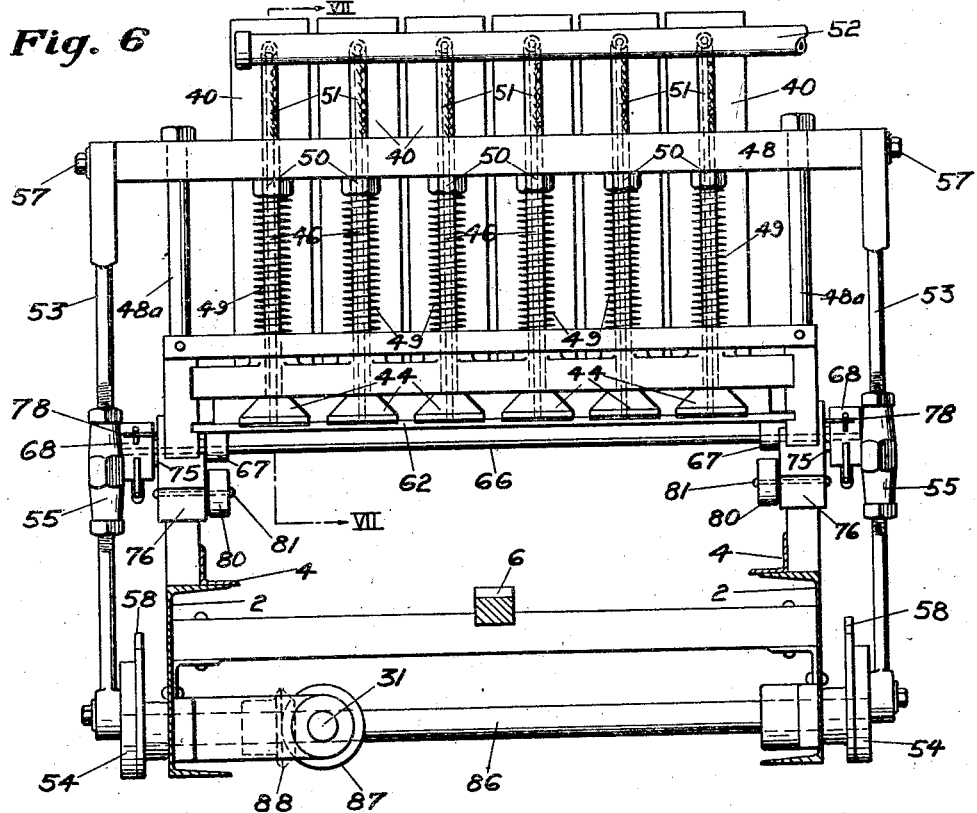
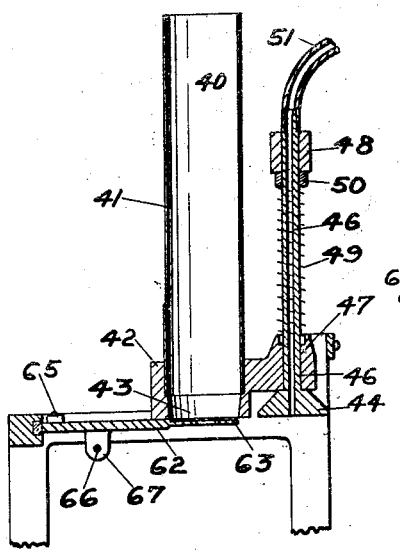
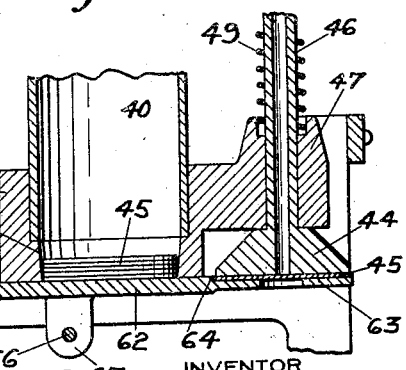
INVENTOR
Christian N. Bergmann
BY
ATTORNEY Feb. 21, 1928. 1,659,802
C. N. BERGMANN
UNIT MEASURING MACHINE
Filed May 7, 1927 4 Sheets-Sheet 4
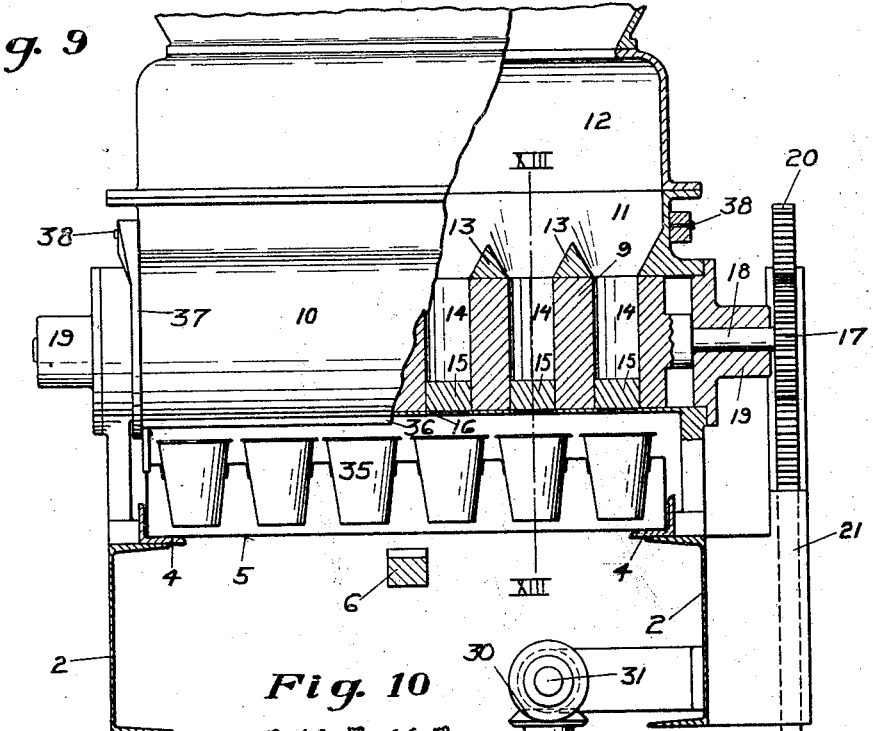
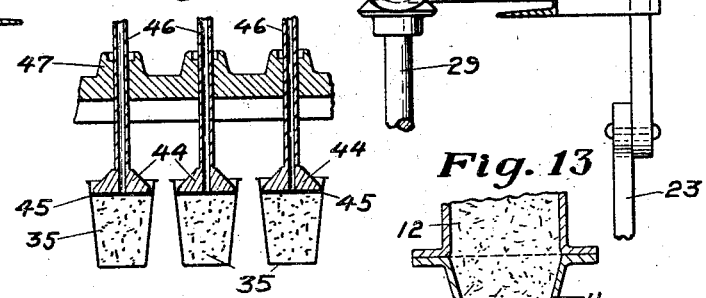
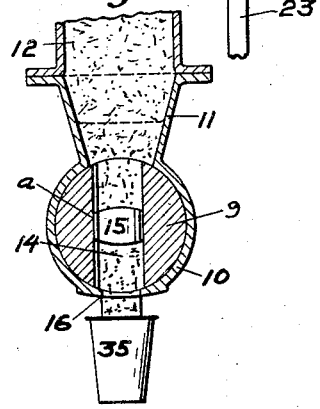
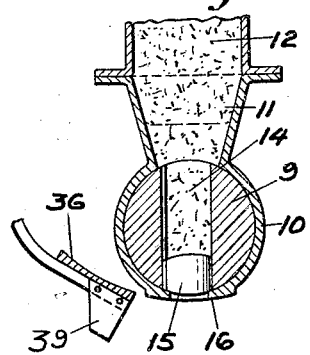
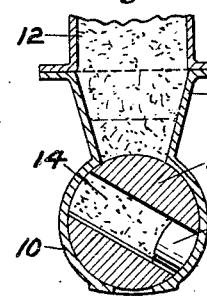

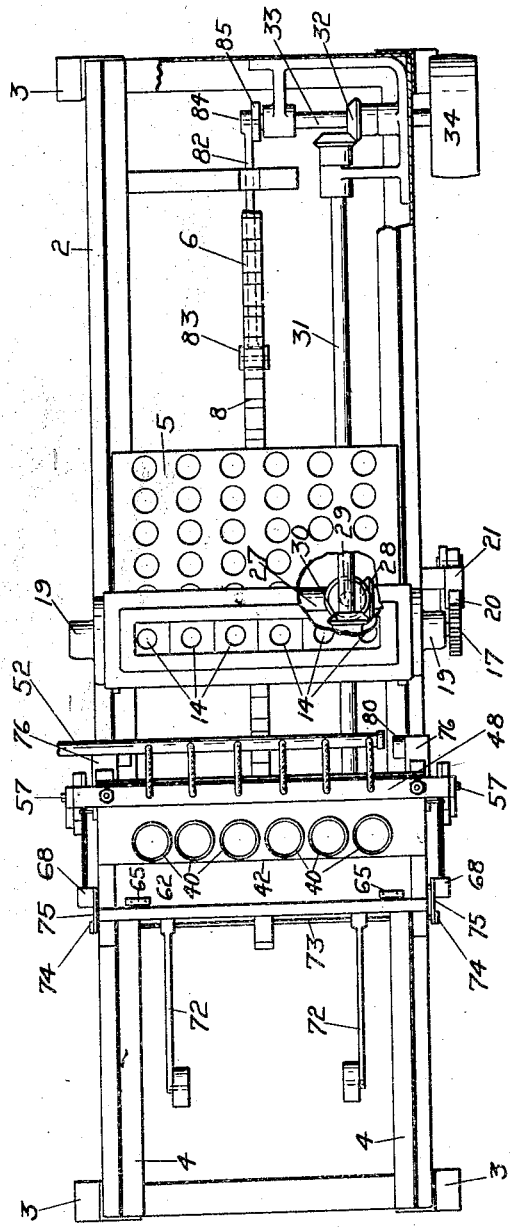

Patented Feb. 21, 1928.

1,659,802

UNITED STATES PATENT OFFICE.

CHRISTIAN N. BERGMANN, OF PITTSBURGH, PENNSYLVANIA, ASSIGNOR TO BERGMANN PACKAGING MACHINE COMPANY, OF PITTSBURGH, PENNSYLVANIA, A CORPORATION OF DELAWARE.

UNIT-MEASURING MACHINE.

Application filed May 7, 1927. Serial No. 189,733.

My invention consists of a machine for measuring units of mobile material continuously from a superimposed mass or supply source, filling said units into suitable receptacles or containers, as cartons, cups, etc., and closing or capping such containers, in the manner more fully hereinafter described. More particularly, the machine is adapted to measure and fill containing cups or cartons with ice cream or other suitable material, for the purpose of vending or storing the same in package form, in a simple, economical, efficient and expeditious manner.

The invention has in view to use one or a continuous series of carrying trays, arranged to hold the receptacles and successively present them in proper position to be filled and sealed, a supporting trackway therefor, and means for advancing the tray and receptacles successively through the machine for filling and closing. Also, means for delivering a measured and approximately shaped amount of material into each receptacle, and means for applying a sealing cover, controlled and operated by the tray so as to ensure proper positioning of the parts throughout the operation.

The machine is so constructed and arranged that one tray after another, filled with empty receptacles, will pass through the machine, and the receptacles will be filled and closed, the tray then passing outwardly at the other end, where it may be removed with its filled contents, ready for use.

In the drawings, illustrating one preferred embodiment of the invention,

Fig. 1 is a plan view of the machine, partly broken away;

Fig. 2 is a view of the machine in side elevation, also partly broken away;

Fig. 3 is an enlarged detail view in side elevation of the actuating mechanism for shifting the sealing disks;

Fig. 4 is a similar detail view, showing the actuating mechanism advanced;

Fig. 5 is a detail view showing the shifting mechanism for the cup carrier or tray;

Fig. 6 is an enlarged cross sectional view on the line VI—VI of Fig. 2;

Fig. 7 is a sectional detail view on the line VII—VII of Fig. 6, showing the disk magazine and pneumatic disk-placing mechanism;

Fig. 8 is a similar enlarged sectional detail view, showing the sealing disk in its shifted position and in register with the pneumatic plunger;

Fig. 9 is a cross section, partly in elevation, indicated by the section line IX—IX of Fig. 2;

Fig. 10 is a sectional detail view showing several of the disk plungers lowered in placing the closing disks within the cups or containers;

Figs. 11, 12 and 13 are cross sectional detail views through a portion of the main hopper and the rotating cylinder, illustrating successive advancing positions of the cylinder and finally delivering the measured unit into the cup, indicated by the line XIII—XIII of Fig. 9.

The machine is generally rectangular in form, having a horizontal supporting frame 2 of any suitable material, as structural shapes, supported by the legs 3—3. Extending upwardly from such main frame at each side of its length are suitable trackways 4, of angle iron or other appropriate shape, for sliding support of the cup carrying frame or tray 5. The latter is adapted to be advanced intermittently along such trackway by the reciprocating bar 6 and engagement thereby of the pawl 7 secured on the under side of the cup frame 5. Said pawl may be made of spring steel, and is adapted to be successively engaged by one of a series of shoulders 8 of bar 6, at the proper time to push the cup carrier or tray forward one space. The shoulders 8 are equally spaced, so as to ensure accuracy in the periodical intermittent movement of the carrier, or a series of them, by the regularity of motion imparted by bar 6.

The cup carrier is provided with suitable receiving cavities extending crosswise of the holder, in rows, spaced apart longitudinally of the holder a distance equaling each forward intermittent movement, whereby to bring each successive row of receptacles underneath the unit measuring mechanism.

The latter, which is of the same general construction and operation as that shown and described in my prior application filed August 2, 1922, Serial No. 579,125, comprises a rotary barrel 9 mounted within a cylindrical casing 10, below the delivery portion 11 of a main hopper 12. Delivery portion 11 is divided by transverse tapered partitions 13, whereby to more easily direct the contents of the hopper into each transverse cavity 14 of barrel 9. Within said barrel, and in each cavity 14 thereof, is the slidably mounted reciprocable valve or bottom 15. Said valve is capable of alternating movement across the middle width of the barrel within each cavity at each half revolution of the barrel, and is limited against further movement by the inwardly projecting annular lip 16 of casing 10, retaining the measured and shaped unit thereabove, as in Fig. 11.

The movable bottom 15 may be of any suitable form, preferably cylindrical, and its opposing ends are also preferably turned to conform to the curvature of the interior of casing 10. In such case, the bottom 15 has a key $a$ in sliding engagement with a groove in the barrel to keep the bottom from turning.

For the purpose of imparting alternating forward and back half rotation to barrel 9, it is provided with a pinion 17 secured to one end of supporting shaft 18, carried by bearings 19 of the hopper mechanism, which pinion is in constant mesh engagement with the teeth of reciprocating rack 20. Rack 20 is slidably mounted in a suitable vertically arranged housing 21 and is pivotally connected at 22 with the pitman 23 having operative connection with the constantly rotating crank 24. Pitman 23 is provided with a slotted link terminal 25 for desired lost motion connection with the crank pin 26 of crank 24, whereby to provide for a temporary period of inertia of barrel 9 during the filling and emptying of the cavities 14 thereof. Crank 24 is secured to the end of constantly rotating shaft 27 which is geared by bevel gearing 28 with shaft 29 extending forwardly therefrom. Shaft 29 in turn is geared by bevel gearing 30 with shaft 31 extending longitudinally of the machine, and geared by bevels 32 with the main power shaft 33 having a driving pulley 34, for connection with any source of power, as will be readily understood.

The movement of said shaft is comparatively slow and the operation of crank 24 is sufficiently gradual to provide for a comparatively long period of rest for barrel 9 and comparatively quick rotation of it to reversed position, as indicated in Figs. 11, 12 and 13.

As fully described in my previous application, the contents of the main reservoir are delivered in measured and shaped unit form from the lower portion of the barrel, while each cavity is at the same time receiving the next charge from its upper portion, the several valves or plungers 15 traveling downwardly and providing an arresting bottom after the previously formed units have been discharged into the transverse series of cups 35.

For the purpose of providing a sealing closure for the outlet apertures at the under side of casing 10, when the machine is not in operation, a closing valve or gate 36 extends across and between the supporting arms 37 which are pivoted at 38 to each end of the main hopper. Depending downwardly from one or both of such arms is an abutment or lug 39 extending into the path of the cup carrier 5, and adapted to be engaged thereby as the cup carrier is progressed underneath the filling mechanism, thereby forcing the gate valve into open position just at the time the cartons or cups are directly under the cavities 14 and in a position to receive the material as it is being discharged, as indicated in Fig. 2. After being pushed outwardly from underneath the several discharge openings, the gate 36 will be maintained open until the cup carrier has been pushed entirely through and beyond, whereupon the gate will swing backwardly and automatically close the several outlet openings from below. The radius of the lower side of the casing 10 corresponds to that of gate 36 from its pivoting center 38, so that the units within cavities 14 cannot be discharged until the gate is swung back.

Beyond the filling mechanism is the capping device for the purpose of placing a series of closing disks of pasteboard or the like into each successive row of filled cups as they are successively advanced along and during their temporary stoppage. For such purpose, I provide a series of vertically arranged tubular magazines 40 mounted above the cup carrier space, across the machine. Each of such magazines, which may be of thin tubular metal, is preferably vertically slotted, as at 41, providing clearance for access to the caps, and mounted at its bottom in a supporting base 42 provided with an interiorly flush delivery opening 43 preferably slightly tapered, as indicated in Figs. 7 and 8.

Between said magazines and the filling mechanism, is a corresponding series of disk-placing plungers 44, the purpose of which is to temporarily hold a series of sealing disks 45 upwardly against their bottoms by pneumatic suction, and to then place them in tight frictional engagement within the interior of each cup 35, tightly sealing the contents. The disk plungers 44 are provided with upwardly extending hollow guide stems 46, slidably mounted in guide extensions 47 and all connected at their tops with a common cross head or bar 48 by which they are reciprocated vertically. Each hollow stem 46 is provided with a spiral lifting spring 49 bearing up underneath a securing nut 50, by which the several stems are fixedly held in operative relation to the cross bar 48, and the cross bar and the several stems are retracted to their highest position after being lowered. The cross bar 48 is maintained for vertical movement by guide pins 48ª extending upwardly from the frame.

For the purpose of creating suction and sufficient partial vacuum to positively hold the several disks 45 in proper position underneath the several plungers 44, the top of each hollow stem 46 is connected by a tubular hose section 51 with a common suction pipe 52 communicating with a pump, vacuum tank, or other suction creating mechanism. The several plungers are intermittently reciprocated, by their common cross bar 48, through connecting rods 53 and continuously moving cranks 54 at each side of the machine. Connecting rods 53 are preferably provided with adjustable turn buckles 55 at their middle portion, providing for adjustment of the stroke of the plungers. The upper portion of each connecting rod is slotted, as at 56, for the purpose of providing for lost motion connection with the terminal bolts or pins 57 of the cross bar.

A crank arm extension 58 is provided with a finger terminal 59 adapted to engage the abutment 60 of arm 61, for the purpose of discharging the lowermost of the series of disks 45 from each magazine tube. This operation is effective through the reciprocation of slide 62 mounted immediately below the series of magazines and having the reduced thickness extension 63 provided with a shoulder 64 adapted to engage and push out the lowermost of each of said series of disks, and to carry them forward into a central registering position with each of the several plungers 44, as clearly shown in Fig. 8.

The forward movement of slide 62 is positively limited by abutment 65 engaging against the base 42. A shaft 66 engages depending lugs 67 of the slide 62 and extends beyond them at each side and is provided with the pivoting pull blocks 68, which impart movement to the slide. Arm 61 is slidably mounted in each block 68 by its reduced terminal 69 extending beyond the arresting shoulder 70, and is normally held retracted by the spring 71 attached by its opposite ends to the block and arm respectively. When the terminal finger 59 engages hooked terminal 60, as arm 58 revolves, the spring 71 is sufficiently strong to draw the blocks 68 forward at each side until abutment 65 makes contact, arms 61 then moving slightly beyond the blocks by their slide extensions 69 until fingers 59 have become disengaged from hooks 60, when they will be retracted by the springs. (See Fig. 4.)

Reverse movement of slide 62 is effected by counterweighted arms 72 of rock shaft 73 having crank arms 74 connected by links 75 with shaft 66. When fingers 59 wipe beyond hooks 60, releasing pulling force on blocks 68, the counter-weighted arms 72 which have been raised by the forward movement of the slide, will retract it by gravity.

Arms 61 and their hooked terminals are normally held up out of the way of rotating arms 58 in an inoperative position until the cup carrier 5 has advanced to bring the first row of filled cups 35 underneath the transverse row of plungers 44.

For the purpose of holding arm 61 raised until such time, so as to render the slide 62 operative only after the row of cups has reached such point, I provide at each side the levers 76. These are pivoted to each side of the frame at 77, and have a pin or abutment 78 extending out underneath the lifting rod or arm 79 of block 68.

The other end of lever 76 acts as a counterweight to normally hold the other end of the lever raised, as in Fig. 3, and is provided with a bearing roller 80. The latter is pivoted at 81 at the inner side of each lever 76, in range of the receptacle carrier or tray 5, so as to be lifted thereby. As the carrier advances and rides underneath rollers 80, lifting them, the upper end of lever 76 is correspondingly lowered, allowing arms 79 and blocks 68 to tilt downwardly sufficiently far to bring the hooked terminal 60 of arm 61 in range of the finger terminal 59 of lever 58, as in Fig. 4. Such operative position of these parts will continue as long as the carrier 5 is in lifting engagement with rollers 80, during which time the carrier is successively advanced for placement of the closing disks in the successive rows of filled receptacles. The capping mechanism above described is the subject of my application filed January 19, 1923, Serial No. 613,595.

Thereafter, the carrier or tray will pass outwardly toward the other end where it may be removed, rollers 80 dropping down behind the carrier and lifting arms 61 to inoperative position until the next carrier is brought into range of the capping mechanism.

The intermittent actuation of the carriers by shouldered bar 6, is effected through the intermittent reciprocation of such bar by the pitman 82 pivoted to the bar or a lug extension thereof at 83 and similarly connected at 84 with crank 85 of shaft 33.

Cranks 54 and 58 are secured to the outer ends of shaft 86 which is geared by bevels 87—88 with shaft 31, the speed of said shafts and of their connected parts being timed to correspond to the coacting filling mechanism actuated through bevels 30 from the same shaft for driving shaft 27 and its connected parts, as will be readily understood. The speed of the several parts of the machine will, of course, be suitably regulated to the work in view, dependent somewhat upon the material being charged into the receptacles and other conditions present.

The several parts as arranged may be varied and the dimensions and capacity of the machine may, of course, be changed to suit the desired capacity and output, and the invention is not, of course, to be limited to the exact construction, arrangement, or number of such parts, but may be variously changed or modified by the skilled mechanic, as will be readily understood.

The construction of the machine and its manner of operation will be clear from the foregoing description. A carrier with its receptacles being placed upon the supporting tracks 4, the carrier will be progressed along underneath the filling mechanism, each row of cups being filled in the manner described, and then covered by the closing disks at the subsequent position, the carrier continuing by its intermittent movements through the machine and beyond the capping mechanism, to the other end, where it may be removed.

It will be seen also that a series of closely adjacent cup carriers may be passed through the machine one after the other, so that no time or space is wasted in securing the maximum capacity and output. The machine is well adapted to the filling of cups or cartons of the kind disclosed for the purpose of vending or storing mobile material, as ice cream, etc., the receptacles themselves and their closing disks being preferably of paper or the like. The invention provides means for placing ice cream, or any similar plastic or mobile material, or, in fact, any suitable substance, in a closed unitary package of attractive appearance, and sanitary condition, and entirely avoids the necessity of any handling of the material in charging.

What I claim is:

1. In a package filling machine, the combination of a supporting frame having a longitudinal trackway, a superimposed transversely arranged reservoir having intermittently operable individually apertured discharging mechanism adapted to deliver a plurality of measured portions from the reservoir downwardly into a transverse series of open top packages for filling the same, a package carrier on the trackway provided with longitudinally spaced transverse series of package holding cavities, means for intermittently moving the carrier along the trackway to locate one transverse series of packages below and in register with the apertures of the discharging mechanism, means directly geared with said means for actuating the discharging mechanism to deliver to the packages between moving periods thereof, means directly geared with both of said means for applying covers to each transverse series of filled packages successively as the carrier is advanced beyond the filling position, and means controlled by the carrier for regulating the operation of the reservoir discharging means and the cover applying means respectively.

2. In a package filling machine, the combination with a package carrier having equally spaced longitudinal series of transverse rows of spaced open top packages therein, of a superimposed reservoir having a rotatable unit measuring and discharging member provided with delivery openings corresponding to the transversely spaced packages for filling the same, co-acting and interconnected means for actuating the package carrier and unit discharging member in synchronism with alternating rest periods, means geared therewith for applying covers to each transverse series of filled packages successively as the carrier is advanced beyond the filling position, actuating mechanism therefor directly geared with the package carrier and unit discharging actuating means, and means controlled by the carrier for regulating the operation of the discharging member and cover applying means respectively.

3. In a package filling machine, in combination, a reservoir provided with an intermittently rotatable unit measuring device for delivering predetermined quantities of material downwardly, a plurality of open top packages, a conveyor for carrying packages to be filled, means geared together for synchronous operation with alternating rest periods for actuating the conveyor and unit measuring device, and means embodying an element adapted to engage the conveyor for regulating the effectiveness of the unit measuring device in depositing material.

4. In a package filling machine, a receptacle support, means to present a receptacle therein to a filling station, rotary measuring means adapted to dispense material to said receptacle at such filling station provided with a unit actuating plunger and a discharge port, and means subject to the presence of the receptacle support for maintaining the discharge port in a condition of open free discharge at each rotation of the measuring means.

5. In a package filling machine, a receptacle support, means to present receptacles therein to a filling station, rotary measuring means adapted to dispense material to said receptacles at such filling station provided with a unit actuating plunger and a discharge port, and means subject to the presence of the receptacle support for maintaining the discharge port in a condition of open free discharge at each rotation of the measuring means.

6. In a package filling machine, a receptacle support, means to present receptacles therein to a filling station, rotary measuring means adapted to dispense material to said receptacles at such filling station provided with a unit actuating plunger and a discharge port, and means subject to actuation by the receptacle support for maintaining the discharge port in a condition of open free discharge at each rotation of the measuring means.

7. In a package filling machine, a receptacle support, means to present receptacles therein to a filling station, rotary measuring means adapted to dispense material to said receptacles at such filling station provided with a unit actuating plunger and a discharge port, and means subject to actuation by the receptacle support for preventing open free discharge from said port in the absence of the receptacle carrier.

8. A package filling machine provided with an intermittently movable receptacle carrier and means for successively presenting receptacles therein to a filling station, rotatable dispensing mechanism at the filling station having a discharge port, and means for maintaining the discharge port either open or closed dependent on the presence at or absence from the filling station of the receptacle carrier.

9. A package filling machine provided with an intermittently movable receptacle carrier and means for successively presenting receptacles therein to a filling station, rotatable dispensing mechanism at the filling station embodying a barrel having a continuous transverse measuring opening, a ported casing therefor, and a slidable plunger in the measuring opening; and a device controlling discharge from the ported casing having a portion adapted to engage the receptacle carrier.

10. A package filling machine provided with an intermittently movable receptacle carrier and means for successively presenting receptacles therein to a filling station, rotatable dispensing mechanism at the filling station embodying a barrel having a transverse measuring opening, a ported casing therefor, and a slidable plunger in the measuring opening; and an opening and closing outlet controlling gate for the ported casing having a portion adapted to engage the receptacle carrier.

In testimony whereof I hereunto affix my signature.

CHRISTIAN N. BERGMANN.